Patented Sept. 27, 1949

2,483,238

UNITED STATES PATENT OFFICE 2,483,238

PURIFICATION OF VAT DYESTUFFS

Mario Scalera, Somerville, N. J., assignor to American Cyanamid Company, New York, N. Y., a corporation of Maine No Drawing. Application March 23, 1944, Serial No. 527,847

12 Claims. (Cl. 260—274)

This invention relates to a new and improved process for producing pure vat dyestuffs containing the ring system:

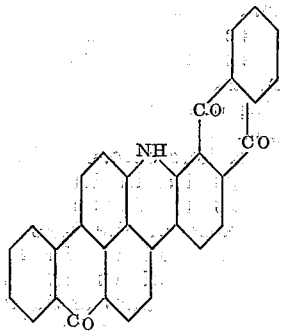

Dyestuffs containing the above ring system are an important class of vat dyestuffs, dyeing textiles and fibers dark green to olive to gray shades, and show exceptional light fastness. The common procedure for preparing these dyestuffs is to react a bzl-halogen benzanthrone with an alpha-amino-anthraquinone, followed by an alkaline fusion. The purity of the dyestuff produced depends primarily on the purity of the halogenated benzanthrone used, and as it is not easy to prepare the halogen benzanthrones in a pure form with good yields the usual process results in a crude product which is quite impure. The cost of purification is high and as it has been a difficult and expensive matter in the past to purify the bzl-chloro benzanthrone used as raw material the cost of the purified final dyestuff has remained quite high. The impure compound does not have the brightness and shade desired and purification is, therefore, necessary.

Dyestuffs of the type to which the present invention relates cannot be purified by a method which is commonly used with other anthraquinone dyestuffs, namely oxidation in aqueous suspension, because this treatment tends to rupture the benz-ring and produce phenanthridones. It has been proposed to purify the dyestuffs by fractional precipitation of their sulfates from sulfuric acid of 80–85% strength. This process is capable of producing a dyestuff of reasonably good purity. However, the process is open to very serious disadvantages. The dyestuffs are quite sensitive to concentrated sulfuric acid. There is a tendency towards sulfonation or decomposition, possibly by oxidation. Therefore, the precipitation has to be carried out at a very low temperature, about 0° C. and even then the yields are considerably lowered. Another practical disadvantage is due to the nature of the precipitated dyestuff sulfates. Unfortunately they come down in a slimy finely crystalline form which presents great technical difficulties in filtration.

The present invention effects a technically excellent purification of the class of dyes referred to which is free from the disadvanges described above. The method of the present invention depends on precipitating the leuco form of the dyestuffs by salting out in aqueous solutions. The impurities remain in solution and the pure dyestuffs may be recovered from the filter cake by reoxidation.

The general procedure of salting out leuco vat dyestuffs is not a new thing in vat dye chemistry. The process has been used with certain other vat dyestuffs which give leuco compounds that are sparingly soluble in water or weak salt solutions. It would ordinarily be expected that the process would be inapplicable to the purification of the dyestuffs to which the present invention is directed because their leuco compounds are in general quite soluble in water and concentrations as high as 10–15% of sodium chloride are necessary in order to effect precipitation. Under these conditions the natural presumption would be that many of the impurities present in the crude dyestuff would also be precipitated, and that probably the recovery of pure dyestuff would be low. Surprisingly enough, I have found that with the dyestuffs to which the present invention is directed it is possible to isolate the leuco form of the dye in a pure state in substantially quantitative recovery, even when crude dyestuffs are treated which have been prepared from halogen benzanthrones of very low purity (40–50%). I do not know why the impurities associated with these particular dyestuffs are not precipitated by the salting out procedure. The exact nature of these impurities is not fully known, but apparently without exception they show an extraordinary solubility in quite concentrated salt solutions.

It is possible to carry out the process of the present invention in various modified ways, and it is an advantage of the present invention that the most satisfactory modification for a particular technical installation may readily be chosen. One very satisfactory procedure is to reduce the crude dyestuff preferably in the form of a paste by means of sodium hydrosulfite and caustic alkali to produce a clear vat, the reduction being effected preferably at slightly elevated temperatures. The salting out agent such as, for example, sodium chloride is then added to cause complete precipitation of the leuco compound. In many cases the latter separates out in almost quantitative yields, free from impurities; but it separates out in a crystalline form which is readily filtered. Filtration and washing of the filter cake proceed along conventional lines and are not critical.

Another modification of the present invention which presents considerable advantages involves the combined purification and formation of the dyestuff. The ring closure of the dyestuff is normally effected by fusion in alcoholic caustic alkali. This results in the production of the leuco dyestuff and the salting out agent may be added directly to the drowned fusion melt, which is then filtered and the purified leuco dyestuff is obtained directly without intermediate isolation of the crude dyestuff. Yields are excellent and a considerable saving in equipment and labor in made possible. This modification, wherever applicable, may, therefore, be considered as a preferred modification of the present invention.

The dyestuffs which may be purified by the process of the present invention are, for instance, the parent compound of the formula:

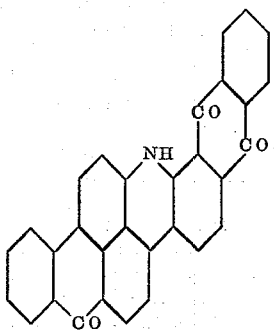

its simple substitution products, such as halogen, alkyl, and alkoxy derivatives; its amino substitution products, including substituted amino products, such as the compound of the formula:

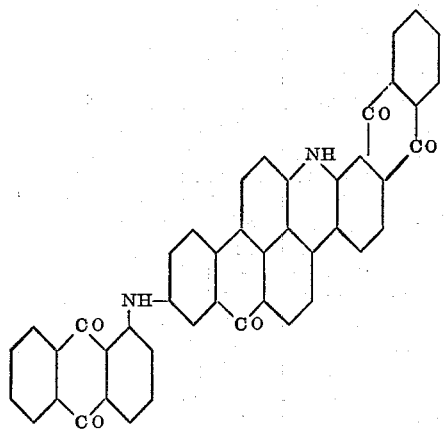

and its acylamino products, such as the compound of the formula:

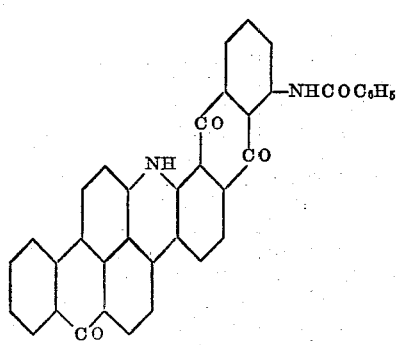

The leuco compounds may be produced by any known means, such as by the alkaline fusion of the intermediate benzanthronyl-anthraquinonyl amines containing the ring system:

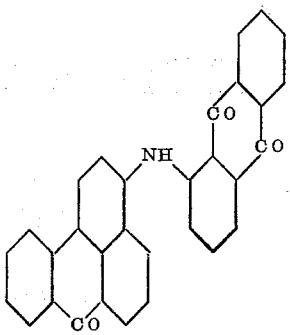

as already mentioned above; or by alkaline reduction of the dyestuffs themselves, for instance with sodium hydrosulfite and alkali.

The salting out of the leuco compound proceeds in accordance with the normal laws, that is to say a common ion enhances the salting out effect. The leuco compound is usually in the form of its sodium salt when sodium is the chosen alkali, and in such case the compound used for salting out should be a readily soluble sodium compound. Typical compounds are sodium chloride, sodium carbonate, or sodium hydroxide. Salting out of the leuco dyestuff in the form of its potassium salt is less satisfactory in most cases because of the high solubility of the potassium compound. Where feasible it would require the use of potassium salts instead of sodium salts. With most of the dyestuffs the sodium salt of the leuco can be salted out more economically and this is the preferred procedure. It is an advantage of the present invention that the precipitation is not at all critical with respect to temperature. Useful results are obtainable at any temperature between 0° and 100° C. The process proceeds most effectively, however, between 50 and 90° C. and this constitutes the preferred range. At lower temperatures the precipitation of the leuco compound is in the form of finer less readily filterable crystals, while higher temperatures make it very difficult to avoid accidental oxidation of the leuco compounds by air. The precipitation must be carried out in a strongly alkaline medium in order to avoid hydrolysis or rearrangement of the leuco form of the impurities which might result in their precipitation and hence in the production of an impure product. However, the exact alkalinity is not critical, although I prefer to operate at a pH above 12.

The invention will be described in greater detail in conjunction with the following specific examples. The parts are by weight.

*Example 1*

Fifty-five parts of the dyestuff resulting from alcoholic potash fusion of crude bzl-benzanthronyl-1-amino-anthraquinone (prepared by reacting the technical bzl-bromo benzanthrone, obtained by bromination of benzanthrone in aqueous suspension, with 1-amino-anthraquinone) are suspended in 2500 parts of water. 120 parts of caustic soda solution of 40° Bé. and 50 parts of commercial sodium hydrosulfite are added.

The vat is heated to 70° C. and treated with an additional 120 parts of 40° Bé. caustic soda and 50 parts of sodium hydrosulfite. While maintaining the same temperature, there are added 1000 parts of concentrated salt solution (25% sodium chloride by weight). The resulting slurry is allowed to cool to 25° C. and filtered.

The crystalline, dark blue presscake of the leuco compound is washed with a 15% solution of sodium chloride containing a little caustic soda and hydrosulfite, until the washings come through pale blue.

The presscake is suspended in water, aerated and filtered. The product may be dispersed to a dye paste or dried. There are obtained 42–45 parts of pure dyestoff, which dyes cotton from the vat in dark green shades which are substantially purer and brighter than those given by the original crude dye. This is the pure dyestuff of the formula:

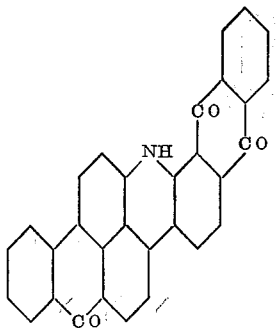

The liquor from the filtration of the leuco compound described above is deep black-brown in color. On aeration and filtering it gives 10–12 parts of a dark compound which dyes cotton from the vat in dull grayish-olive to brownish-olive shades.

Example 2

Fifty-six parts of the same crude dyestuff used in the preceding example, preferably in the form of a wet filler cake, are suspended in 3000 parts of water and vatted by the addition of 240 parts of 40° Bé. caustic soda solution and 100 parts of sodium hydrosulfite. The resulting vat is heated to 70° C. and treated with an additional 700 parts of 40° Bé. caustic soda solution, preheated to the same temperature.

The slurry is cooled to 25° C. and filtered. The dark, blue-black presscake is washed with a solution of caustic soda of approximately 12° Bé., containing a little sodium hydrosulfite, until the washings come through clear pale blue.

There are obtained 36–40 parts of a very pure dyestuff substantially identical to that described in Example 1. From the filtered vat solution the olive colored byproduct described in the preceding example may be obtained by aeration and filtering.

Example 3

140 parts of crude dyestuff of the formula:

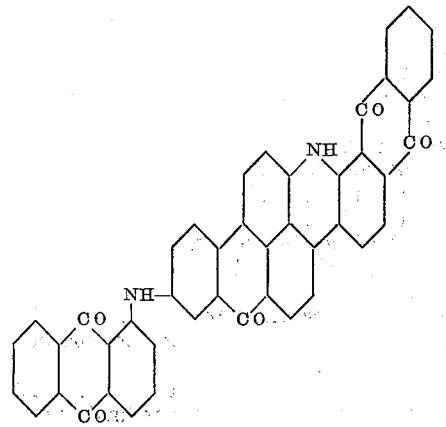

(obtainable by the reaction of 2 mols of alpha amino anthraquinone with 1 mol. of 6, bzl-dibromo benzanthrone, followed by fusion with alcoholic potash), in the form of a 20% presscake, are slurried in 5000 parts of water and vatted by the addition of 700 parts of caustic soda and 200 parts of sodium hydrosulfite.

The clear vat is heated to 70° C. and 930 parts of sodium chloride are added at the same temperature over 30 minutes. The solution is allowed to cool to 25° C. and filtered.

The presscake contains a dyestuff which dyes from the vat olive shades which are substantially greener and brighter than those obtained from the crude starting material.

Example 4

50 parts of the benzanthronyl amino dianthrimide of the formula:

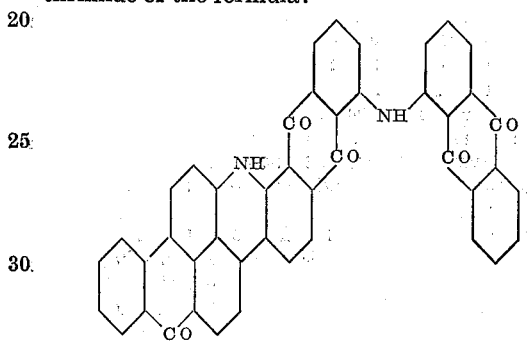

(obtainable by the reaction of 5-amino-1,1'-dianthrimide with bzl-bromo benzanthrone in nitrobenzene, in the presence of an acid-binding substance and a copper catalyst) are heated in a melt of 500 parts of caustic potash and 250 parts of methanol under reflux until ring closure occurs.

The resulting slurry is poured into 3000 parts of water, 50 parts of sodium hydrosulfite and 400 parts of sodium chloride are added thereto, and the slurry is cooled to 25° C. and filtered. The presscake is washed with 15% salt brine containing a small amount of hydrosulfite until the washings are colorless.

The cake is then slurried in water, aerated, filtered and washed free of alkali. The dyestuff thus obtained dyes cotton in pure gray shades which are considerably brighter than those obtainable by the same fusion when the purification through the leuco compound is omitted.

In the above Example 4, the mixture formed by combining the potash melt with the water, the sodium hydrosulfite and the sodium chloride contained a total of about 4% by weight of combined sodium.

Example 5

91 parts of the dyestuff of the formula:

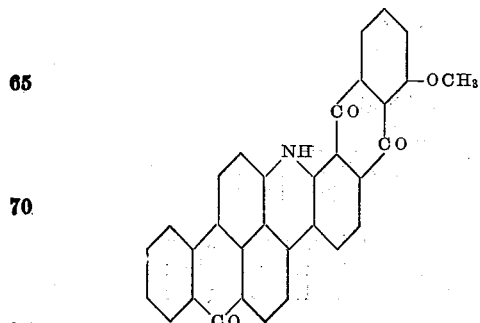

(obtainable by the reaction of bzl-chloro benzanthrone with 1-amino-5-methoxy anthraquinone in boiling nitrobenzene in the presence of soda ash and cupric chloride, followed by ring closure in alcoholic potash) are vatted in 4500 parts of water by the aid of 450 parts of caustic soda and 130 parts of sodium hydrosulfite.

The solution is heated to 70° C., 600 parts of sodium chloride are added, and the slurry is filtered at 60° C. and washed with warm 10% salt brine.

The compound dyes cotton in green shades. From the filtrate of the leuco compound there can be isolated by aeration 5–10 parts of a by-product dyeing cotton dull olive shades.

Example 6

180 parts of alpha amino anthraquinone and 200 parts of the product resulting from chlorination of benzanthrone in concentrated sulfuric acid are reacted together in boiling nitrobenzene in the presence of sodium carbonate and cuprous iodide for 20 hours.

The reaction mixture is cooled, filtered, the product washed with nitrobenzene and steamed free of solvent. There are obtained 275–280 parts of a brownish violet body which is a mixture of various products.

50 parts of this material are charged into a melt of 250 parts of caustic potash and 125 parts of methanol and heated at 150–155° C. for 1 hour. 250 parts of water are added to the melt while distilling out the alcohol. The resulting solution is poured into 2000 parts of water, and 10–20 parts of sodium hydrosulfite (to forestall air oxidation) and 400 parts of common salt are added.

The slurry is cooled, filtered, and the residue washed with a solution containing 15% sodium chloride, 5% caustic soda, and 1% sodium hydrosulfite, until the washings are clear, faint bluish-purple.

From the presscake can be isolated 15–16 parts of the pure dyestuff described in Examples 1 and 2, or a yield of 30% to 31% of the theoretical.

The fraction soluble in the reducing liquor may be recovered by aeration. It amounts to 32–33 parts and dyes cotton bluish-gray shades.

Example 7

50 parts of technically pure benzanthronyl-anthraquinonylamine of the formula:

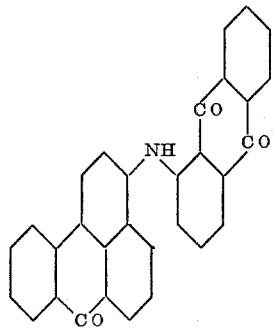

(obtained by reacting bzl-chloro benzanthrone, prepared by chlorination of benzanthrone in 92% phosphoric acid according to my copending application Serial No. 527,846, filed March 23, 1944, now Patent No. 2,418,318, with 1-amino anthraquinone) are introduced at 150° C. into a melt of 250 parts of caustic potash in 125 parts of methanol.

The resulting black slurry is heated to reflux (158–159° C.) for 1 hour and then 250 parts of water are cautiously added while allowing the alcohol to distill out. The resulting solution is diluted with an additional 250 parts of water and is poured into 2000 parts of water to give a clear, deep blue solution. 10–20 parts of sodium hydrosulfite are added, if necessary, to prevent oxidation by the air; then the solution is heated to 85° C., and 400 parts of common salt are added slowly at this temperature. The resulting slurry is cooled, filtered and washed with 15% brine solution (containing a small amount of dissolved caustic soda and hydrosulfite) until the drippings are pale blue and translucent.

The presscake is suspended in 2000 parts of water, aerated, boiled, filtered and washed to neutrality. There are obtained 43–44 parts of the green dyestuff of the formula:

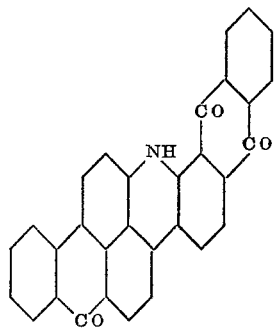

in a state of great purity.

By aeration of the filtered vat liquor there are obtained 5 parts of a dark product, probably a mixture, which dyes cotton dull olive shades from a purple brown vat.

I claim:

1. A method for the purification of a water-soluble leuco derivative of a vat dyestuff selected from the group consisting of a leuco derivative of the vat dyestuff of the following formula:

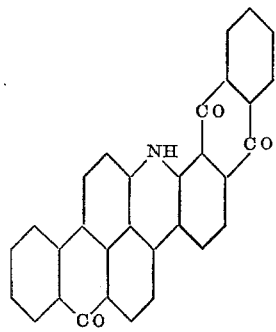

and leuco derivatives of the halogen substituted, alkyl substituted, alkoxy substituted, amino substituted, anthraquinonylamino substituted, and acylamino substituted derivatives of said dyestuff, which comprises the steps of forming a strongly alkaline vat of said leuco derivative, mixing with said vat an amount of a soluble ionizable sodium compound sufficient to form a precipitate of a leuco derivative of said dyestuff and also to form a mixture containing a total of at least about 4% by weight of combined sodium, and recovering said precipitated leuco derivative in substantially pure form.

2. A process according to claim 1, in which the precipitation is effected at a temperature between 50° and 90° C.

3. A process according to claim 1, in which the precipitation is effected in a vat having a pH of at least 12.

4. A method for the purification of a water-soluble leuco derivative of a vat dyestuff of the following formula:

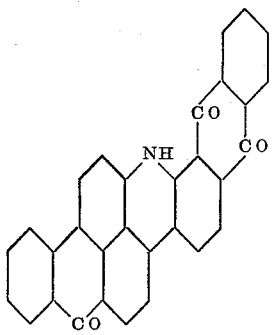

which comprises the steps of forming a strongly alkaline vat of said leuco derivative, mixing with said vat an amount of a soluble ionizable sodium compound sufficient to form a precipitate of a leuco derivative of said dyestuff and also to form a mixture containing a total of at least about 4% by weight of combined sodium, and recovering said precipitated leuco derivative in substantially pure form.

5. A process according to claim 4, in which the precipitation is effected at a temperature between 50° and 90° C.

6. A process according to claim 4, in which the precipitation is effected in a vat having a pH of at least 12.

7. A method for the purification of a water-soluble leuco derivative of a vat dyestuff of the following formula:

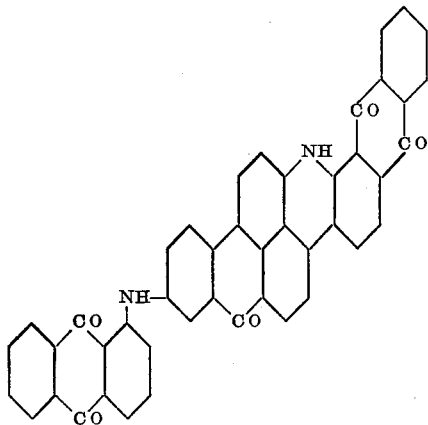

which comprises the steps of forming a strongly alkaline vat of said leuco derivative, mixing with said vat an amount of a soluble ionizable sodium compound sufficient to form a precipitate of a leuco derivative of said dyestuff and also to form a mixture containing a total of at least about 4% by weight of combined sodium, and recovering said precipitated leuco derivative in substantially pure form.

8. A process according to claim 7, in which the precipitation is effected at a temperature between 50° and 90° C.

9. A process according to claim 7, in which the precipitation is effected in a vat having a pH of at least 12.

10. A method for the purification of a water-soluble leuco derivative of a vat dyestuff of the following formula:

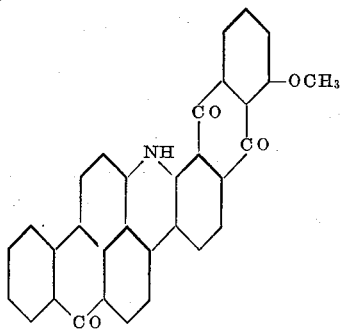

which comprises the steps of forming a strongly alkaline vat of said leuco derivative, mixing with said vat an amount of a soluble ionizable sodium compound sufficient to form a precipitate of a leuco derivative of said dyestuff and also to form a mixture containing a total of at least about 4% by weight of combined sodium, and recovering said precipitated leuco derivative in substantially pure form.

11. A process according to claim 10, in which the precipitation is effected at a temperature between 50° and 90° C.

12. A process according to claim 10, in which the precipitation is effected in a vat having a pH of at least 12.

MARIO SCALERA.

REFERENCES CITED

The following references are of record in the file of this patent:

UNITED STATES PATENTS

| Number | Name | Date |
|---|---|---|
| 995,936 | Wolff | June 20, 1911 |
| 1,150,863 | Just | Aug. 24, 1915 |
| 1,828,592 | Bommer | Oct. 20, 1931 |
| 1,961,921 | Honold | June 7, 1932 |
| 1,935,724 | Neresheimer | Nov. 21, 1933 |
| 2,091,102 | Peck | Aug. 24, 1937 |
| 2,150,109 | Stallmann | Mar. 7, 1939 |
| 2,212,029 | Lulek | Aug. 20, 1940 |
| 2,251,566 | Graham | Aug. 5, 1941 |
| 2,312,462 | Wuertz | Mar. 2, 1943 |